United States Patent [19]

Sobel

[11] Patent Number: 4,609,964
[45] Date of Patent: Sep. 2, 1986

[54] REINFORCEMENT FOR MAGNETIC RECORDING DISK

[75] Inventor: Alvin A. Sobel, Paramus, N.J.

[73] Assignee: Coronet Paper Corporation, Carlstadt, N.J.

[21] Appl. No.: 540,884

[22] Filed: Oct. 11, 1983

[51] Int. Cl.$^4$ .............................................. G11B 5/82
[52] U.S. Cl. .................................................. 360/135
[58] Field of Search ............ 360/133, 135, 137, 97–99; 156/295, 291; 369/290

[56] References Cited

U.S. PATENT DOCUMENTS 4,480,282  10/1984  Brock et al. ........................ 360/135

FOREIGN PATENT DOCUMENTS 3425501  1/1985  Fed. Rep. of Germany ...... 360/135
56-134334  10/1981  Japan ................................. 360/135

OTHER PUBLICATIONS

IBM/TDB, vol. 19, No. 1, Jun. 1976, "Flexible Disk Structure", by Orlando.

*Primary Examiner*—John H. Wolff
*Attorney, Agent, or Firm*—Samuelson & Jacob

[57] ABSTRACT

A magnetic disk reinforcement member in which in adhesive layer is spaced from the peripheral edges of the reinforcement member to preclude exuding of the adhesive beyond the peripheral edges as a result of forces applied to the reinforcement member and the adhesive layer during use of the magnetic disk. Also disclosed is a blank for completing the reinforcement member subsequent to assembling the reinforcement member with the magnetic disk to assure concentricity between the opening in the reinforcement member and the central aperture of the magnetic disk.

24 Claims, 7 Drawing Figures

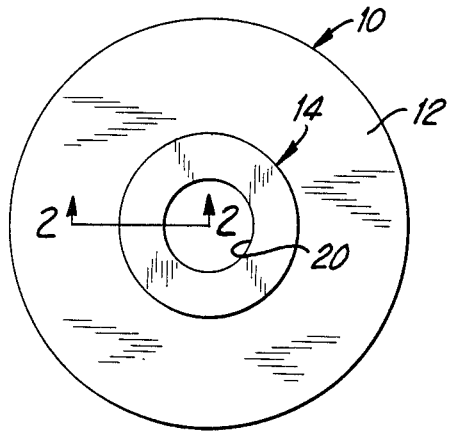
FIG. 1
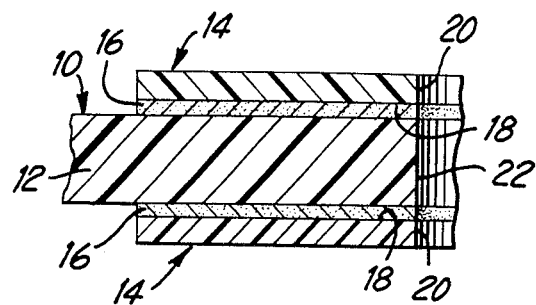
PRIOR ART  FIG. 2
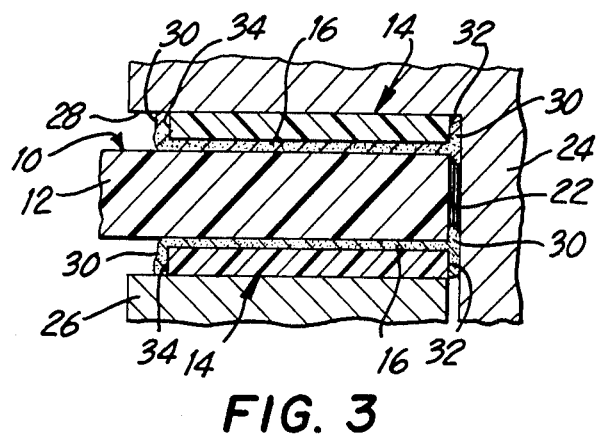
PRIOR ART  FIG. 3
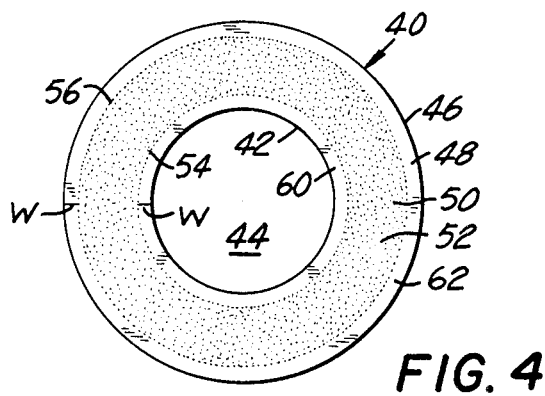
FIG. 4
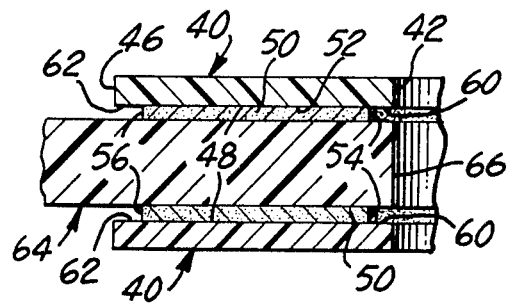
FIG. 5
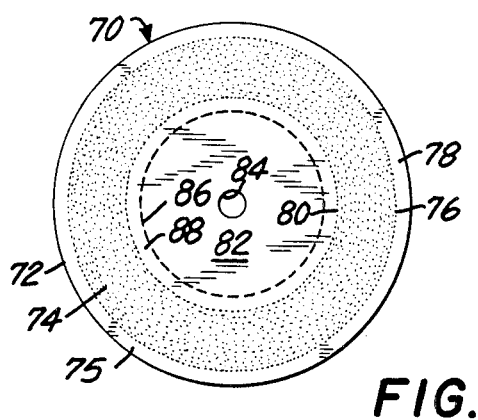
FIG. 7
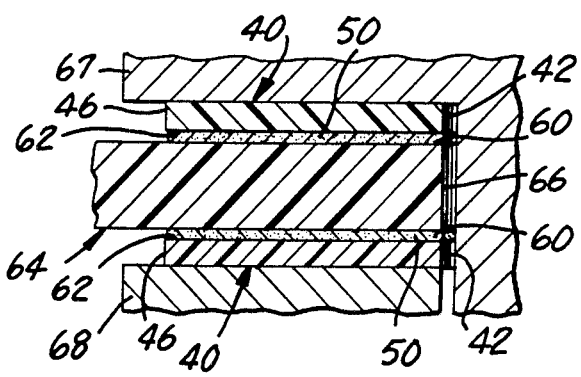
FIG. 6

REINFORCEMENT FOR MAGNETIC RECORDING DISK

The present invention relates generally to magnetic recording disks of the type employed in connection with data storage and processing equipment and pertains, more specifically, to the reinforcement of the central portion of such disks.

The need for and the nature of reinforcement means adhered to the central portion of a magnetic recording disk is set forth in some detail in U.S. Pat. No. 4,052,750 in which an annular reinforcement member is shown affixed to a magnetic recording disk by means of a pressure-sensitive adhesive. In a later patent, U.S. Pat. No. 4,370,689, there is some discussion of disadvantages associated with the flow or movement of the adhesive during the service life of the magnetic recording disk. In addition to those disadvantages, it has been found that the pressure applied to the reinforcement members by the spindles of the data processing machines in which the disks are used tends to cause the adhesive to exude from between the reinforcement member and the disk so as to present bare adhesive beyond the peripheral edges of the reinforcement member. Such exuded adhesive has been found to be transferred to the spindles of the machines, causing a deleterious build-up of adhesive and consequent malfunctions in the machine. The cleaning of the adhesive from the spindles becomes an extensive and costly maintenance procedure.

It is an object of the present invention to reduce to a minimum, and even to eliminate, the exuding of adhesive beyond a peripheral edge of a reinforcement member adhered to the central portion of a magnetic recording disk so as to preclude the deleterious build-up of exuded adhesive within the machine which utilizes the disk.

Another object of the invention is to provide a reinforcement of the type described having a construction which enables the use of relatively inexpensive, conventional materials and procedures in the manufacture of magnetic recording disks, yet eliminates disadvantages found to be present in current reinforcement arrangements.

Still another object of the invention is to provide a blank for making a reinforcement member of the type described and for accurately locating the reinforcement member in prescribed registration on the magnetic recording disk.

The above objects, as well as further objects and advantages, are attained by the present invention which may be described briefly as providing an improvement in a magnetic recording disk reinforcement including an annular member for placement around the central aperture of the disk and an adhesive on an adhesive area of the annular member for securing the member to the disk, the annular member having an inner peripheral edge and an outer peripheral edge, and the adhesive area having an inner perimeter corresponding to the inner peripheral edge of the annular member and an outer perimeter corresponding to the outer peripheral edge of the annular member, the improvement comprising: a generally annular spacing placed between at least one of the inner perimeter and outer perimeter of the adhesive area and the respective inner peripheral edge and outer peripheral edge of the annular member, the spacing being great enough to preclude exuding of the adhesive beyond the corresponding peripheral edge as a result of forces applied to the adhesive during use of the magnetic recording disk, and small enough to maintain the annular member secure to the disk closely adjacent the corresponding peripheral edge of the annular member.

The invention will be understood more fully, while still further objects and advantages will become apparent, in the following detailed description of embodiments of the invention illustrated in the accompanying drawing, in which:

FIG. 1 is a top plan view of a magnetic recording disk having a conventional reinforcement member adhered thereto;

FIG. 2 is an enlarged fragmentary cross-sectional view taken along line 2—2 of FIG. 1;

FIG. 3 is a view similar to FIG. 2, but showing the disk in place in a data processing machine during use;

FIG. 4 is a bottom plan view of a reinforcement member constructed in accordance with the present invention;

FIG. 5 is an enlarged fragmentary cross-sectional view similar to FIG. 2, but illustrating the reinforcement member of FIG. 4;

FIG. 6 is a view similar to FIG. 3, but illustrating the reinforcement member of FIGS. 4 and 5; and FIG. 7 is a bottom plan view of a blank for use in providing a reinforcement member in accordance with the invention.

Referring now to the drawing, a typical, currently available magnetic recording disk 10 is shown in FIG. 1 and is seen to include an annular disk body 12 illustrated without the usual protective jacket within which such disks are housed. A reinforcement member 14 has an annular configuration and is affixed to either side of disk body 12, as shown in FIG. 2, by means of an adhesive layer 16 coated on the underside 18 of each reinforcement member 14. Typical reinforcement members are constructed of a synthetic resin, such as Mylar, having a thickness of about five mils and are coated with a pressure-sensitive adhesive, such as an acrylic adhesive, having a layer thickness of about 0.0009 to 0.0013 inch. The adhesive layer 16 extends over the entire underside 18 of the reinforcement member 14, and the reinforcement member is registered so that the central opening 20 of the reinforcement member 14 is registered precisely with the central aperture 22 of the disk body 12.

Turning now to FIG. 3, when in use in a data processing machine (not shown) disk 10 receives a spindle 24 of the data processing machine within the central aperture 22 of the disk 10 and a clutch member 26 engages one side of the disk 10, along the corresponding reinforcement member 14, and urges the disk 10 against a shoulder 28 of the spindle 24 to clamp the disk 10 between the shoulder 28 and the clutch member 26 for rotation of the disk 10 with the spindle 24.

As illustrated in a somewhat exaggerated form, the pressure exerted by the clutch member 26 and the shoulder 28 of spindle 24 upon the respective reinforcement members 14 is transmitted to the adhesive layers 16 and, as a result of the forces thereby applied to the adhesive layers 16, adhesive will be exuded at 30, beyond the inner and outer peripheral edges 32 and 34, respectively, of the reinforcing members 14. At least some of the exuded adhesive 30 will tend to adhere to the clutch member 26 and the spindle 28. Eventually, an accumulation of adhesive deposits on the clutch member 26 and spindle 28 could interfere with effective operation of the data processing machine. Consequently, it becomes necessary to clean accumulated adhesive from the clutch member and the spindle at regular intervals. Such a maintenance procedure can be tedious, time-consuming and costly, especially in view of the limited access provided by most data processing machines to the component parts which must be cleaned.

Referring now to FIG. 4, a reinforcement member constructed in accordance with the present invention is illustrated at 40 and is seen to have an annular configuration including an inner peripheral edge 42 lying along a central opening 44 and an outer peripheral edge 46. Reinforcement member 40 is constructed of a synthetic resin material having the same general characteristics and dimensions as those described above in connection with conventional reinforcement members and is to be used in essentially the same manner.

To this end, underside 48 of reinforcement member 40 is provided with an adhesive layer 50; however, adhesive layer 50 extends along only a limited area 52 of the underside 48, between an inner perimeter 54 adjacent inner peripheral edge 42, and an outer perimeter 56 adjacent outer peripheral edge 46. An inner spacing 60 thus is placed between the inner peripheral edge 42 and inner perimeter 54 of area 52, and an outer spacing 62 is placed between outer peripheral edge 46 and outer perimeter 56, both spacings 60 and 62 having an annular configuration.

Turning now to FIG. 5, a reinforcement member 40 is affixed to each side of a magnetic recording disk 64, with the central openings 44 of the reinforcement members registered with the central aperture 66 of the disk. Prior to forcing the reinforcement members 40 toward the corresponding side of the disk 64, the adhesive layer 50 is spaced from the inner and outer peripheral edges 42 and 46 by the spacings 60 and 62. Spacings 60 and 62 are small enough so that the reinforcement members 40 are secured to the disk 64 over almost the entire area of the underside 48 of each reinforcement member and closely adjacent the inner and outer peripheral edges 42 and 46. In a typical reinforcement member 40, the spacings 60 and 62 are in the order of about 0.010 inch along width W. The thickness of the adhesive layer is about 0.0007 inch to about 0.0010 inch.

During use of the disk 64 in a data processing machine, as seen in FIG. 6, the disk 64 and the reinforcement members 40 will be located between a clutch member 67 and a spindle 68 and the reinforcement members 40 will be urged against the disk 64, as explained above. Adhesive layers 50 will be compressed axially and the adhesive will be displaced radially; however, such displacement merely moves the adhesive layer 50 into the spacings 60 and 62 and the adhesive will not exude beyond the peripheral edges 42 and 46. Thus, the adhesive does not adhere to the clutch member 67 or to the spindle 68 and there will be no accumulation of adhesive on these component parts of the data processing machine, thereby eliminating the need for costly cleaning procedures.

Reinforcement members 40 are installed upon disk 64 by placing the reinforcement members 40 in appropriate registration with the disk 64 and pressing the reinforcement members 40 against the disk 64 to adhere the reinforcement members 40 to the disk 64. However, in order to assure concentricity between the inner peripheral edge 42 and the central aperture 66 of the disk 64, it is sometimes the practice to affix a reinforcing member in place upon a disk prior to cutting the central opening 44 of the reinforcing member 40 and the central aperture 66 of the disk 64 so that both the opening 44 and the aperture 66 can be cut subsequently, as by punching, to simultaneously form the opening 44 and the aperture 66 and assure that the opening 44 and the aperture 66 are concentric. In such instances, the present invention provides a blank 70, as illustrated in FIG. 7, constructed in a manner quite similar to the fully-formed reinforcement member 40, but extending radially inwardly beyond what will be the inner peripheral edge of the complete reinforcement member. Thus, blank 70 is constructed of the same thin sheet of synthetic resin material as reinforcement members 14 and 40 and includes an outer peripheral edge 72 and an adhesive layer 74 upon the underside 75 of the blank 70. The adhesive layer 74 has an annular configuration which includes an outer perimeter 76, spaced from the outer peripheral edge 72 by a spacing 78, and an inner perimeter 80. The material of blank 70 extends radially inwardly well beyond inner perimeter 80 and includes a central web portion 82.

Blank 70 includes locator means, shown in the form of a central pilot hole 84 in the web portion 82, for assisting in the location and placement of blank 70 upon a magnetic recording disk blank (not shown) in which the central aperture has not yet been formed. The pilot hole 84 then enables accurate location of a punching tool relative to the assembled reinforcement member and disk blanks for simultaneously punching out the web portion 82 of the blank 70, and corresponding portion of the disk blank, to establish an inner peripheral edge along the phantom line 86 and complete a reinforcement member while at the same time placing the inner peripheral edge of the reinforcement member in concentric registration with the central aperture formed in the disk. Thus, precise and uniform registration is achieved. Since the inner perimeter 80 of the adhesive layer 74 is spaced radially from phantom line 86, a spacing 88 will space the inner perimeter 80 from the inner peripheral edge of the completed reinforcement member, for the purposes set forth above in connection with the description of the use of a disk in a data processing machine, as illustrated in FIGS. 5 and 6.

It is to be understood that the above detailed description of embodiments of the invention is provided by way of example only. Various details of design and construction may be modified without departing from the true spirit and scope of the invention as set forth in the appended claims.

The embodiments of the invention in which an exclusive property or privilege is claimed are as follows:

1. In a magnetic recording disk reinforcement including an annular member for placement around the central aperture of the disk and an adhesive on a substantially planar adhesive area of the annular member for securing the member to a generally corresponding substantially planar area of the disk, the annular member having an inner peripheral edge for placement in general alignment with the central aperture of the disk and an outer peripheral edge, and the adhesive area having an perimeter adjacent the inner peripheral edge of the annular member and an outer perimeter adjacent the outer peripheral edge of the annular member, the improvement comprising:

a generally annular spacing placed between the inner perimeter of the adhesive area and the inner peripheral edge of the annular member, the spacing being great enough to preclude exuding of the adhesive beyond the inner peripheral edge as a result of forces applied to the adhesive by operational element-of a drive mechanism during use of the magnetic recording disk in the drive mechanism, and small enough to maintain the annular member secure to the disk closely adjacent the inner peripheral edge of the annular member, whereby exuded adhesive will not interfere with the operational elements of the drive mechanism.

2. The invention of claim 1 wherein the adhesive is a pressure-sensitive adhesive.

3. The invention of claim 2 wherein the adhesive is in the form of a layer having a thickness of about 0.0007 inch to about 0.0010 inch.

4. The invention of claim 3 wherein the generally annular spacing has a width of about 0.010 inch.

5. The invention of claim 1 including a further generally annular spacing placed between the outer perimeter of the adhesive area and the outer peripheral edge of the annular member, the further spacing being great enough to preclude exuding of the adhesive beyond the outer peripheral edge as a result of forces applied to the adhesive during use of the magnetic recording disk, and small enough to maintain the annular member secure to the disk closely adjacent the outer peripheral edge of the annular member.

6. The invention of claim 5 wherein the adhesive is a pressure-sensitive adhesive.

7. The invention of claim 6 wherein the adhesive is in the form of a layer having a thickness of about 0.0007 inch to about 0.0010 inch.

8. The invention of claim 7 wherein the generally annular spacing has a width of about 0.010 inch.

9. In a blank for making a magnetic recording disk reinforcement including an annular member for placement around the central aperture of the disk and an adhesive on a substantially planar adhesive area of the annular member for securing the member to a generally corresponding substantially planar area of the disk, the annular member having an inner peripheral edge for placement in general alignment with the central aperture of the disk and an outer peripheral edge and the adhesive area having an inner perimeter adjacent the inner peripheral edge of the annular member and an outer perimeter adjacent the outer peripheral edge of the annular member, the improvement comprising:

a generally annular spacing placed between the inner perimeter of the adhesive area and the position where the inner peripheral edge of the annular member will be upon completion of the annular member, the spacing being great enough to preclude exuding of the adhesive beyond the completed inner peripheral edge as a result of forces applied to the adhesive during use of the magnetic recording disk, and small enough to maintain the annular member secure to the disk closely adjacent the inner peripheral edge of the annular member when the inner peripheral edge is completed and the annular member is located in prescribed registration with the magnetic recording disk; and locating means in the blank for enabling accurate location of the blank relative to the magnetic recording disk for securing to blank to the disk in the prescribed registration and for completing the inner peripheral edge of the annular member.

10. The invention of claim 9 wherein the locating means includes a pilot hole in the blank.

11. The invention of claim 10 wherein the pilot hole is centrally located in the blank.

12. The invention of claim 9 wherein the adhesive is a pressure-sensitive adhesive.

13. The invention of claim 12 wherein the adhesive is in the form of a layer having a thickness of about 0.0007 inch to about 0.0010 inch.

14. The invention of claim 13 wherein the generally annular spacing has a width of about 0.010 inch.

15. The invention of claim 14 wherein the locating means includes a pilot hole in the blank.

16. The invention of claim 15 wherein the pilot hole is centrally located in the blank.

17. The invention of claim 9 wherein the blank includes an outer peripheral edge coinciding with the outer peripheral edge of the annular member and including a further generally annular spacing placed between the outer perimeter of the adhesive area and the outer peripheral edge of the blank, the further spacing being great enough to preclude exuding of the adhesive beyond the outer peripheral edge of the blank as a result of forces applied to the adhesive during use of the magnetic recording disk, and small enough to maintain the blank secure to the disk closely adjacent the outer peripheral edge of the blank.

18. The invention of claim 17 wherein the locating means includes a pilot hole in the blank.

19. The invention of claim 18. wherein the pilot hole is centrally located in the blank.

20. The invention of claim 17 wherein the adhesive is a pressure-sensitive adhesive.

21. The invention of claim 20 wherein the adhesive is in the form of a layer having a thickness of about 0.0007 inch to about 0.0010 inch.

22. The invention of claim 21 wherein the generally annular spacing has a width of about 0.010 inch.

23. The invention of claim 22 wherein the locating means includes a pilot hole in the blank.

24. The invention of claim 23 wherein the pilot hole is centrally located in the blank.

* * * * *